US008887041B2

(12) United States Patent  (10) Patent No.: US 8,887,041 B2
Jang  (45) Date of Patent: Nov. 11, 2014

(54) DISPLAYING A CALL FUNCTION WITHIN A WEB BROWSER

(75) Inventor: Se Yoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 405 days.

(21) Appl. No.: 12/970,524

(22) Filed: Dec. 16, 2010

(65) Prior Publication Data

US 2011/0258530 A1 Oct. 20, 2011

(30) Foreign Application Priority Data

Apr. 19, 2010 (KR) .................. 10-2010-0035858

(51) Int. Cl.
G06F 17/30 (2006.01)
(52) U.S. Cl.
CPC .............................. *G06F 17/30905* (2013.01)
USPC ............ 715/253; 715/234; 715/744; 715/795
(58) Field of Classification Search
CPC .......................... G07F 17/3089; G07F 17/211
USPC ........................................................ 715/234
See application file for complete search history.

(56) References Cited

U.S. PATENT DOCUMENTS

| 2005/0165626 | A1 | 7/2005 | Karpf | |
| 2006/0242557 | A1 | 10/2006 | Nortis, III | |
| 2007/0073650 | A1 | 3/2007 | Lueck | |
| 2008/0104505 | A1* | 5/2008 | Keohane et al. | 715/246 |
| 2008/0139191 | A1* | 6/2008 | Melnyk et al. | 455/419 |
| 2008/0184128 | A1* | 7/2008 | Swenson et al. | 715/738 |
| 2010/0077321 | A1* | 3/2010 | Shen et al. | 715/760 |

FOREIGN PATENT DOCUMENTS

WO WO 2010/034067 4/2010

OTHER PUBLICATIONS

European Search Report for Application 11156180.9 dated Sep. 23, 2011.
Greg Murray; "Asynchronous Java Script Technology and XML (Ajax) with the Java Platform;" Internet Citation, Jun. 9, 2005 (updated Oct. 2006) XP007900932; pp. 1-5.

* cited by examiner

*Primary Examiner* — Cesar Paula
*Assistant Examiner* — Mohammed-Ibrahim Zuberi
(74) *Attorney, Agent, or Firm* — Ked & Associates, LLP

(57) ABSTRACT

A mobile terminal and controlling method thereof are disclosed, which facilitates a terminal to be used in further consideration of user's convenience. According to at least one of embodiments of the present invention, while a webpage is being displayed in a mobile terminal, a function frequently used by the mobile terminal is available by interconnecting to the webpage despite that the webpage is not closed. The present invention includes storing an object oriented program having a prescribed function, accessing an external server providing a webpage, driving a web browser for a webpage source by receiving the webpage source of the webpage from the external server, and displaying the webpage by rendering the webpage provided by the external server with a modified webpage having the prescribed function reflected thereon in a manner that the web browser configures a document object model tree using the web browser source and the object oriented program together.

13 Claims, 14 Drawing Sheets

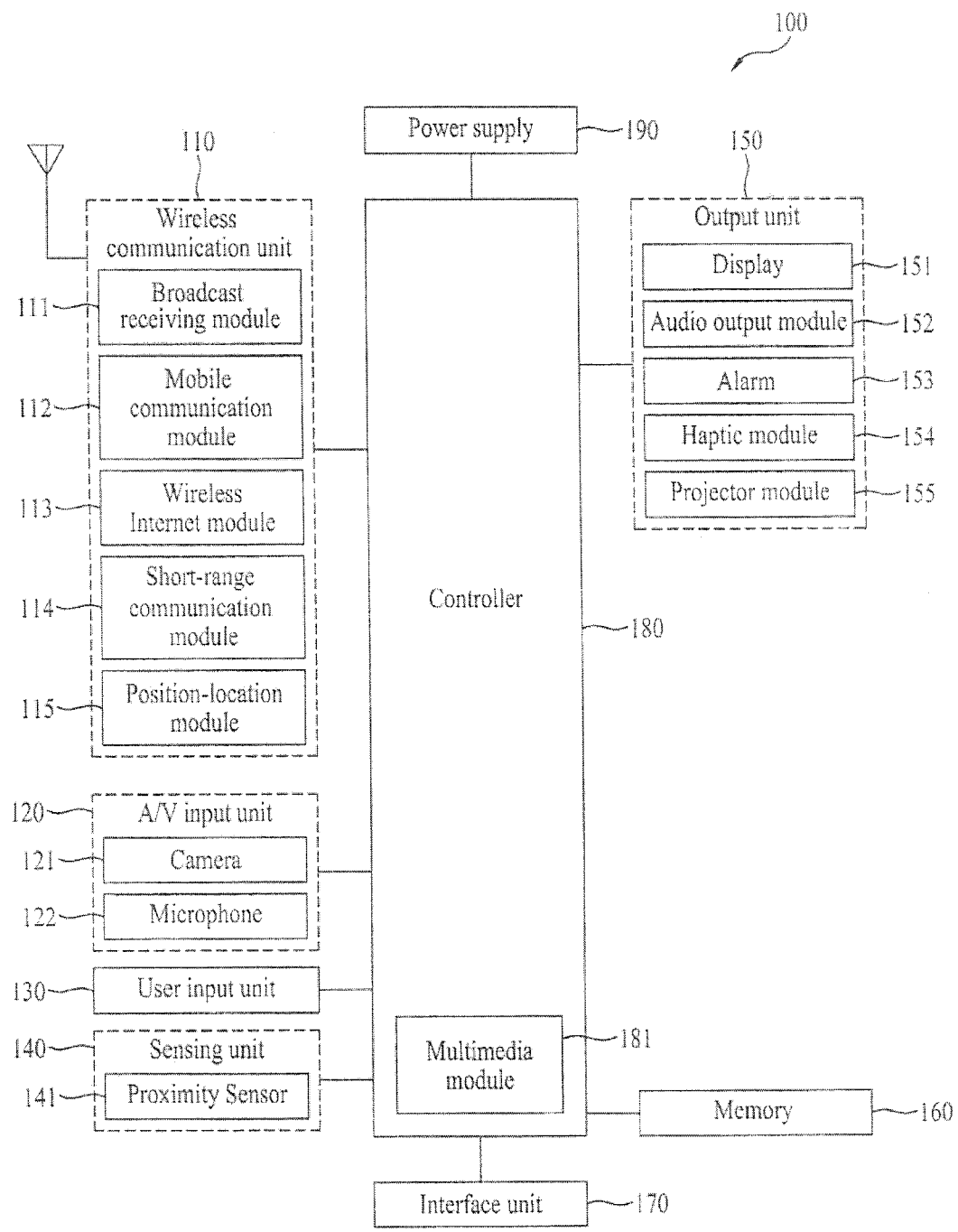

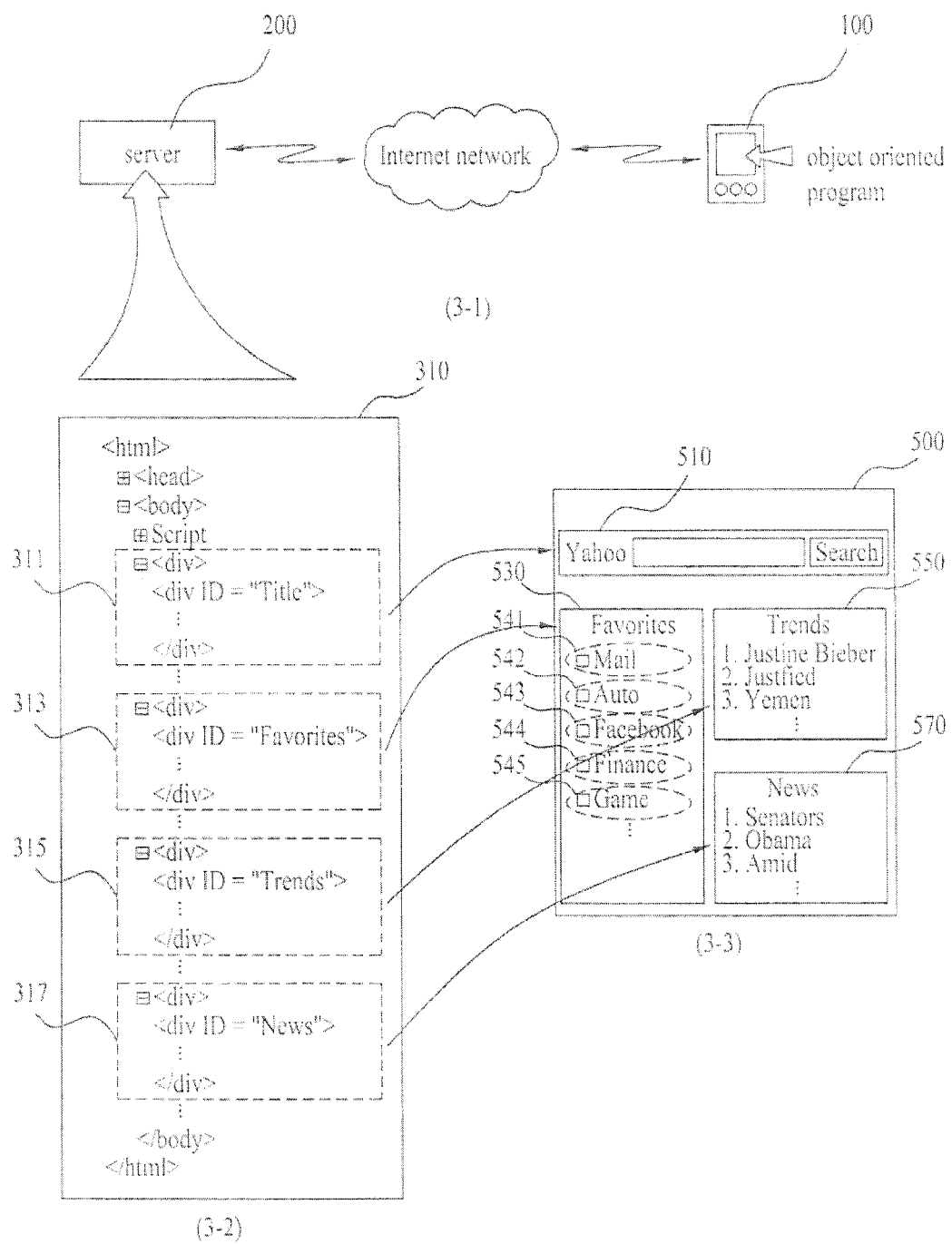

FIG. 6
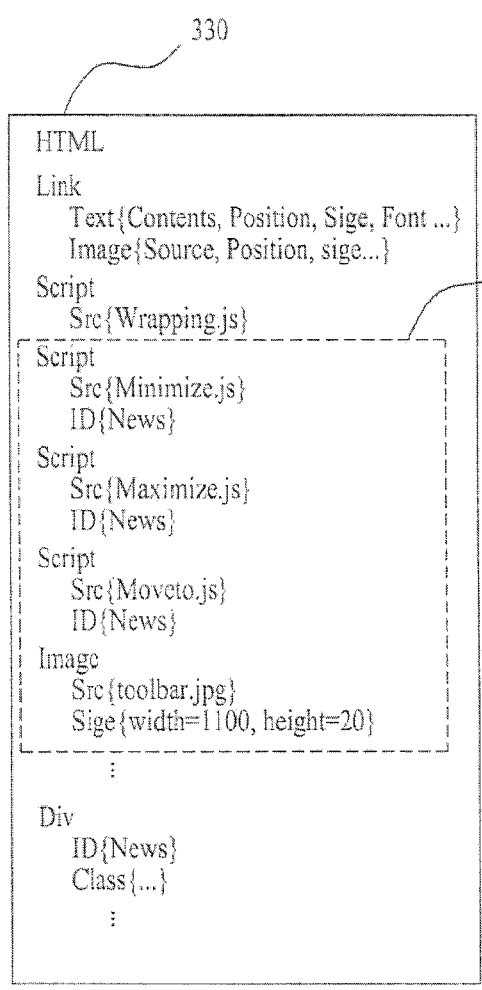
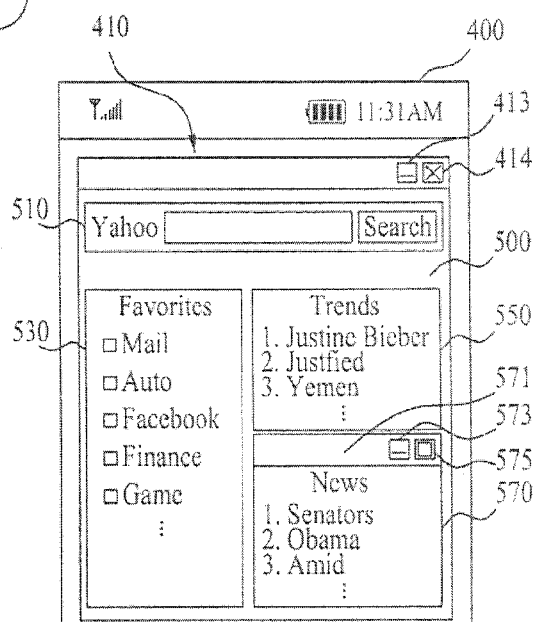
(6-1)
(6-2)

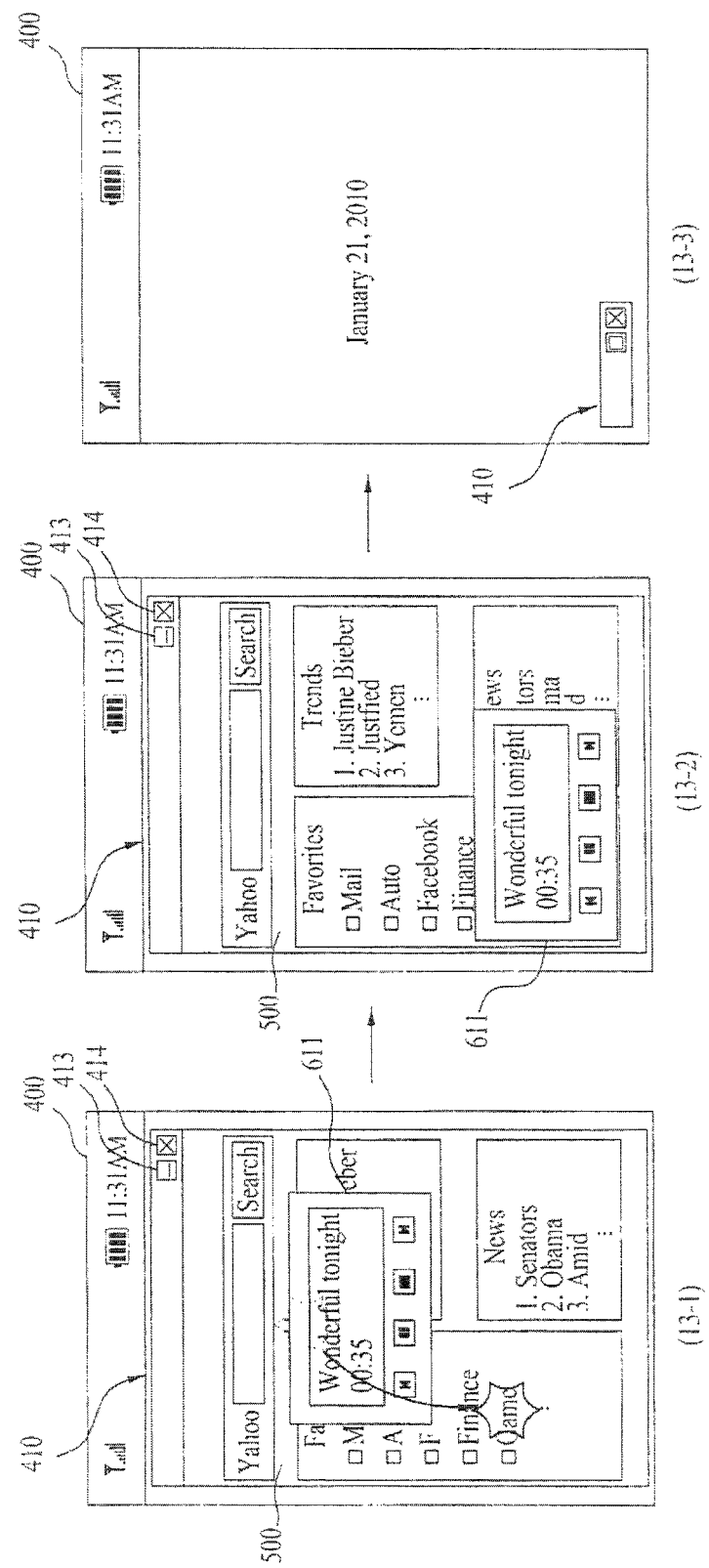

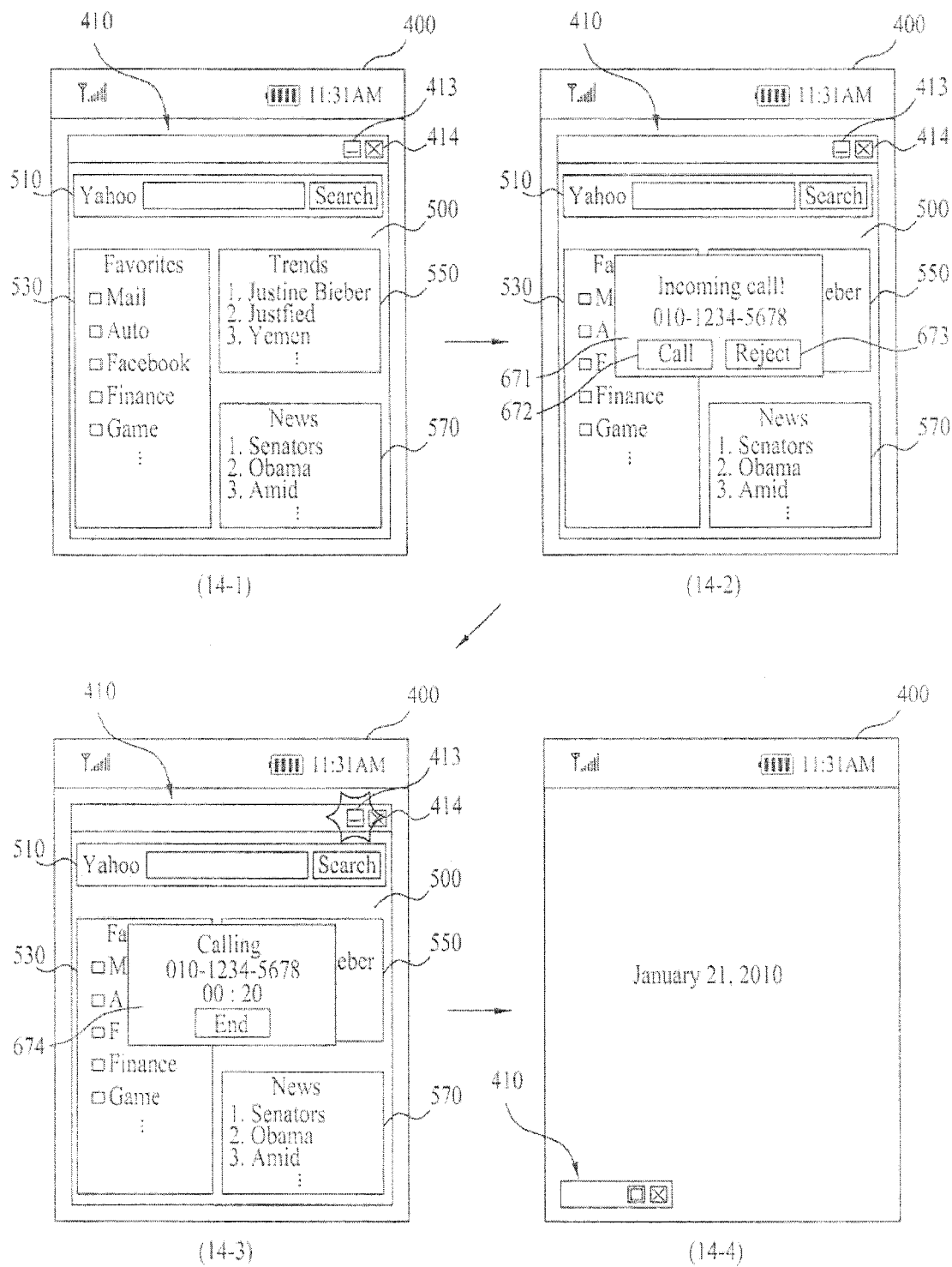

DISPLAYING A CALL FUNCTION WITHIN A WEB BROWSER

CROSS-REFERENCE TO RELATED APPLICATION(S)

Pursuant to 35 U.S.C. §119(a), this application claims the benefit of earlier filing date and right of priority to Korean Application No. 10-2010-0035858, filed on Apr. 19, 2010, the contents of which are hereby incorporated by reference herein in their entirety.

BACKGROUND

1. Field

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Background

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, mobile terminals capable of web surfing are ongoing to be released. When a webpage is displayed in a mobile terminal, if the mobile terminal has a limited size of a display screen or there are a lot of contents to be displayed on the webpage, it may be inconvenient for a terminal user to view the webpage. Therefore, many efforts need to be made to research and develop a method for a terminal user to conveniently view a webpage on a limited-size display screen of a mobile terminal.

BRIEF DESCRIPTION OF THE DRAWINGS

The embodiments will be described in detail with reference to the following drawings in which like reference numerals refer to like elements wherein:

FIG. 1 is a block diagram of a mobile terminal according to one embodiment of the present invention;

FIG. 3 is a schematic diagram of a wireless environment in which a method of controlling a mobile terminal according to an embodiment of the present invention can be implemented;

FIG. 5 and FIG. 6 are diagrams of a display screen and a corresponding document object structure for implementing a method of controlling a mobile terminal according to an embodiment of the present invention;

FIG. 13 and FIG. 14 are diagrams of display screens for implementing a method of controlling a mobile terminal according to an embodiment of the present invention.

DETAILED DESCRIPTION

Figure 2A:
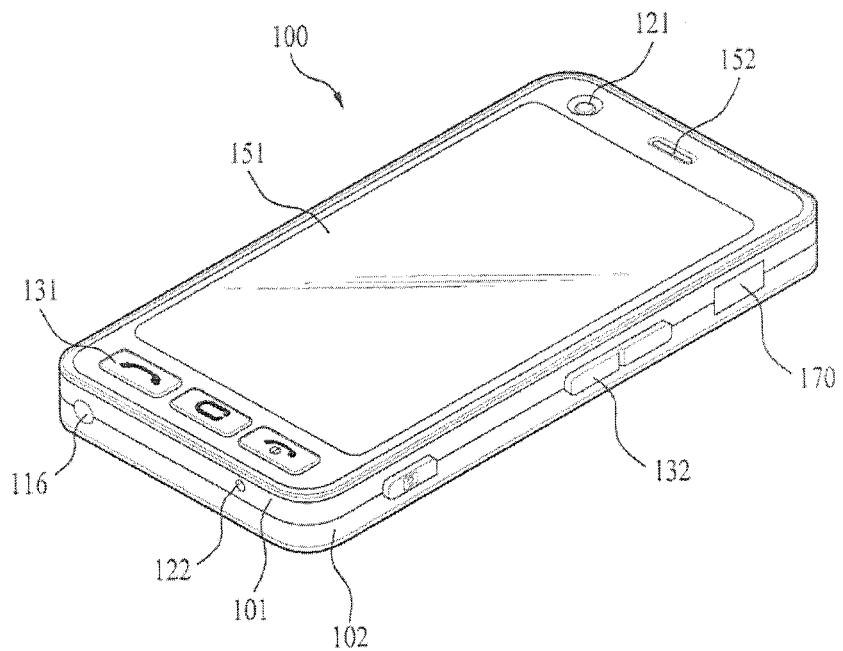
FIG. 2A is a front perspective diagram of a mobile terminal according to one embodiment of the present invention.

Accordingly, the present invention is directed to a mobile terminal and controlling method thereof that substantially obviate one or more problems due to limitations and disadvantages of the related art.

An object of the present invention is to provide a mobile terminal and controlling method thereof, by which a webpage can be conveniently viewed on a display screen having a limited size despite a considerable size of contents to be displayed on the webpage.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a wireless communication unit configured to access an external server providing a webpage, a memory configured to store an object oriented program having a prescribed function, and a controller configured to receive a webpage source of the webpage from the external server and drive a web browser for the received webpage source, and to control the web browser to render and display a modified webpage where the prescribed function is reflected on the webpage provided by the external server in a manner that the web browser configures a document object model tree using the web browser source and the object oriented program together.

In another aspect of the present invention, a method of controlling a mobile terminal according to the present invention includes storing an object oriented program having a prescribed function, accessing an external server providing a webpage, receiving a webpage source of the webpage from the external server, driving a web browser for the received webpage source, and controlling the web browser to render and display a modified webpage where the prescribed function is reflected on the webpage provided by the external server in a manner that the web browser configures a document object model tree using the web browser source and the object oriented program together.

It is to be understood that both the foregoing general description and the following detailed description of the present invention are exemplary and explanatory and are intended to provide further explanation of the invention as claimed.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. The broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS (Convergence of Broadcasting and Mobile Service), OMA-BCAST (Open Mobile Alliance-BroadCAST), media forward link only (MediaFLO®), CMMB (China Multimedia Mobile Broadcasting), MBBMS (Mobile Broadcasting Business Management System), and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile communication network such as (but not limited to) GSM (Global System for Mobile communications), CDMA (Code Division Multiple Access), and WCDMA (Wideband CDMA). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include (but not limited to) WLAN (Wireless LAN) (Wi-Fi), Wibro (Wireless broadband), Wimax (World Interoperability for Microwave Access), HSDPA (High Speed Downlink Packet Access) GSM, CDMA, WCDMA, LTE (Long Term Evolution), etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

And, the memory 160 may store a web browser relevant program for displaying a webpage which is received by accessing an external server via the wireless communication unit. Moreover, the memory 160 may store at least one object oriented program available for the received webpage. The object oriented program shall be described later in this disclosure.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
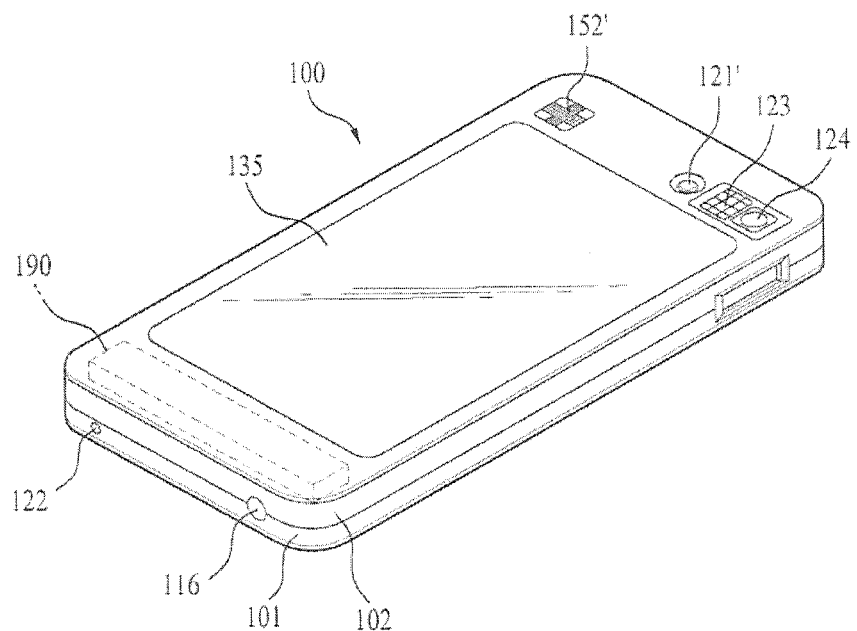
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a wireless environment, in which a mobile terminal controlling method according to an embodiment of the present invention can be implemented, is schematically explained with reference to FIG. 3.

FIG. 3 is a schematic diagram of a wireless environment in which a method of controlling a mobile terminal according to an embodiment of the present invention can be implemented.

Referring to FIG. 3 (3-1), the wireless communication unit 110 of the mobile terminal 100 is able to access an external server 200 via Internet network. The external server 200 is able to provide a webpage to terminals which access the external server 200 via Internet.

A webpage source for implementing the webpage is stored in the external server 200. The webpage source can include HTML (hypertext markup language) 310 shown in FIG. 3 (3-2) for example. The webpage source shown in FIG. 3 (3-2) is schematically diagrammatized for the clarity and convenience of the description. And, the webpage source can further include more HTML elements for the smoother webpage implementation.

Based on the webpage source, a webpage 500 shown in FIG. 3 (3-3) can be implemented for example. The webpage 500 shown in FIG. 3 (3-3) is schematically illustrated for the clarity of the illustration. And, the webpage 500 can include a portion of a whole screen of an actual webpage implemented by the webpage source.

Generally, a webpage can be constructed with a plurality of sections. FIG. 3 (3-3) exemplarily shows that the webpage 500 is constructed in a manner of including 4 sections, i.e., first to fourth sections 510, 530, 550 and 570.

The first to fourth sections 510, 530, 550 and 570 can correspond to first to fourth 'div' elements 311, 313, 315 and 317 of the webpage source 310, respectively.

Each of the sections can include a plurality of subsections below itself if necessary. FIG. 3 (3-3) exemplarily shows a plurality of subsections 541 to 544 are included below the second section 530. For clarity of the drawing, 'div' elements corresponding to the subsections in the webpage source 310 shown in FIG. 3 (3-2) are omitted.

The first to fourth sections located at the top in a hierarchical order of all the sections included in the webpage 500 shall be named 'main section'.

Meanwhile, at least one or more object oriented programs can be stored in the memory 160 of the mobile terminal 100 connected to the external server 200 via Internet. In this case, the object oriented programs can be included in the memory 160 when the mobile terminal 100 was released from the manufacturer. Alternatively, after a terminal user has purchased the mobile terminal 100, the object oriented programs can be downloaded to the memory 160 via Internet for example.

When the mobile terminal 100 displays the webpage 500 by receiving the webpage source 310 from the external server 200, the object oriented programs may provide a prescribed function to the webpage 500 which the external server 200 originally attempt to implement. In particular, the object oriented program enables the mobile terminal 100 to arbitrarily give a function, which was not originally intended by the external server 200 providing the webpage 500, to the webpage 500. In this case, the object oriented program can include Java script (JavaScript), by which the present invention is non-limited.

The present invention exemplarily proposes the object oriented programs shown in Table 1.

TABLE 1

| object oriented programs | Corresponding functions |
| --- | --- |
| Minimize.js | Minimize section of webpage |
| Maximize.js | Maximize section of webpage |
| Moveto.js | Move section of webpage |
| Scroll.js | Scroll section of webpage |
| MP3.js | Generate MP3 function section on webpage |
| Mobile_TV.js | Generate mobile TV function section on webpage |
| Dual_Clock.js | Generate dual-clock function section on webpage |
| Call.js | Generate call function section on webpage |

The object oriented programs can be classified into programs applicable in association with an existing section and programs applicable irrespective of an existing section. In the following description, an object oriented program dependently applicable in association with an existing section present at the webpage shall be named 'dependent object oriented program' (e.g., Minimize.js, Maximize.js, Moveto.js, Scroll.js, etc., while an object oriented program independently applicable irrespective of an existing section present at the webpage shall be named 'independent object oriented program' (e.g., MP3.js, Mobile_TV.js, Dual_Clock.js, Call.js, etc.).

In the following description, embodiments relating to a controlling method applicable to the mobile terminal in the above-mentioned wireless environment are explained with reference to the accompanying drawings. And, it is understood that the following embodiments are available independently or in a manner of being combined with each other.

The following description is made on the assumption that the display module 151 includes a touchscreen. And, a display screen of the touchscreen 151 is indicated by a reference number 400 in the following description.

First of all, a case of applying a dependent object oriented program to the webpage is described as follows.

Figure 4:
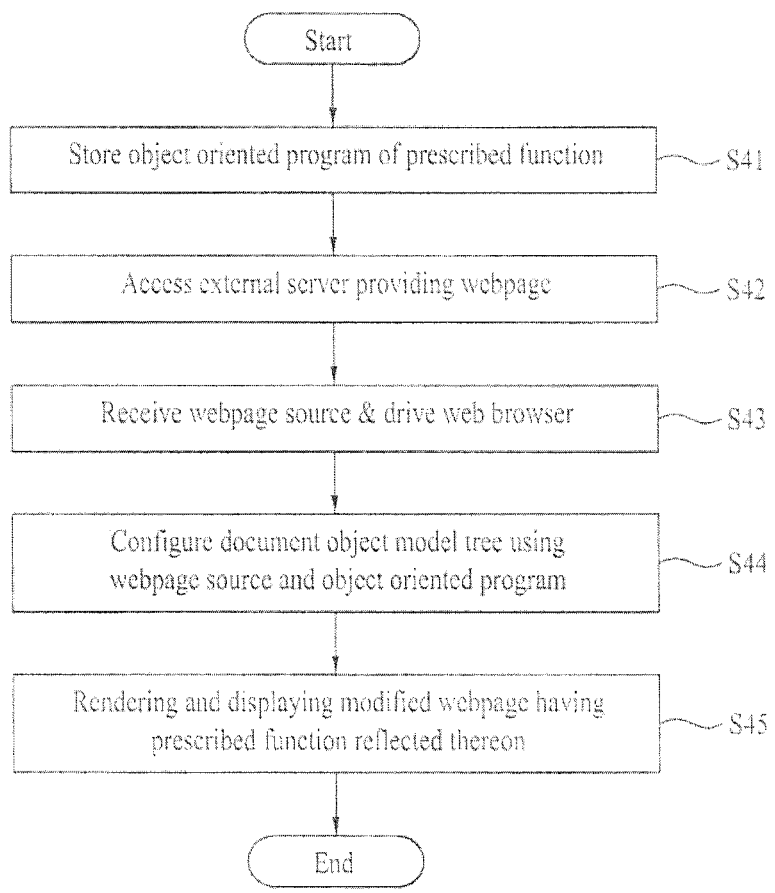
FIG. 4 is a flowchart for a method of controlling a mobile terminal according to an embodiment of the present invention.
Figure 5:
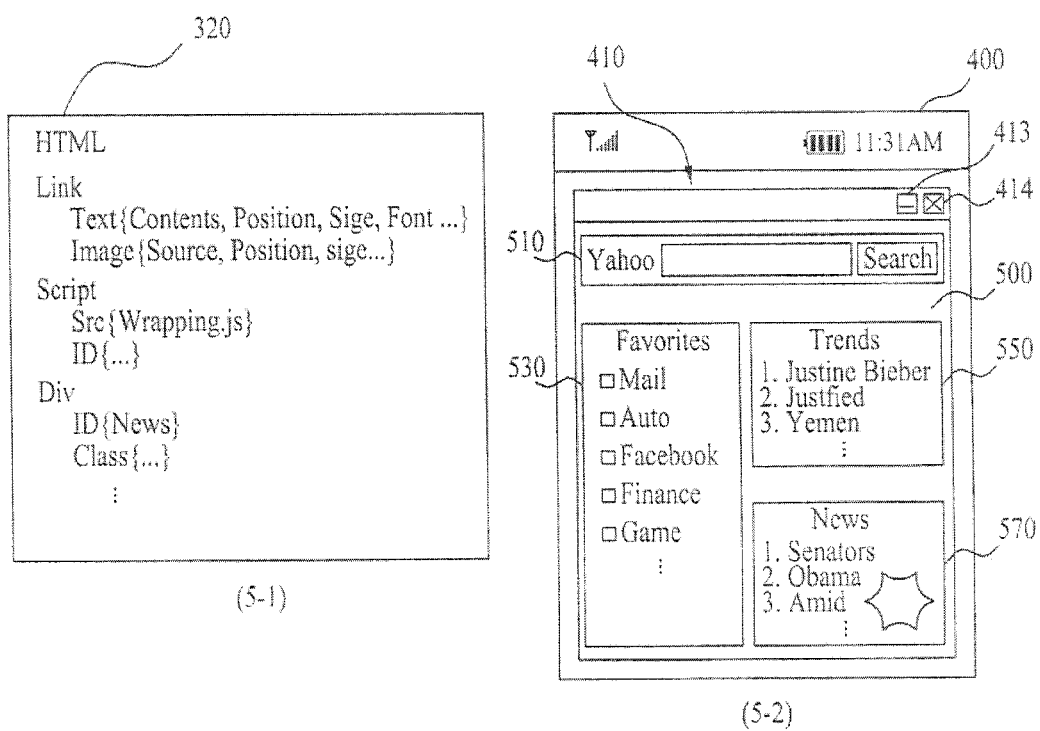

FIG. 4 is a flowchart for a method of controlling a mobile terminal according to an embodiment of the present invention, and FIG. 5 and FIG. 6 are diagrams of a display screen and a corresponding document object structure for implementing a method of controlling a mobile terminal according to an embodiment of the present invention.

As mentioned in the foregoing description, at least one object oriented program is stored in the memory 160 of the mobile terminal 100 in advance [S41].

And, a toolbar image (toolbar.jpg) for displaying a corresponding section of the webpage to implement a function of the object oriented program can be stored in the memory 160 of the mobile terminal 100.

The mobile terminal 100 accesses the external server via Internet using the wireless communication unit 110 [S42].

The mobile terminal 100 receives the webpage source from the external server 200 and the controller 180 drives (or activates) a web browser [S43].

The controller 180 controls to configure a document object model tree, as shown in FIG. 5 (5-1), using the received webpage source via the driven web browser [S44]. For clarity, the document object model tree configured using the received webpage source shall be named a first document model tree in the following description.

The controller 180 displays a web browser window 410, as shown in FIG. 5 (5-2), on the touchscreen 400. And, the controller 180 controls the web browser to render and display the webpage 500, which is originally intended by the web server 200, in the web browser window 410 using the first document object mode tree 320. A window minimizing icon 413 and a window closing icon 414 can be provided within the web browser window 410. Since the window minimizing icon 413 and the window closing icon 414 are apparent to and easily understood by those skilled in the art, their details shall be omitted from the following description for clarity.

A terminal user is able to select one section, e.g., a fourth section 570 from first to fourth sections 510, 530, 550 and 570 of the displayed webpage 500. In this case, the section selection can be performed through an appropriate manipulation of the user input unit 130. Alternatively, the selection can be made by a touch action performed on the touchscreen 400. For instance, if the terminal user touches an empty portion of the fourth section 570 (e.g., a simple touch, a double-touch, a long-touch, etc.), the fourth section 570 can be selected.

If so, in order to apply a corresponding function of at least one of the dependent object oriented programs to the selected fourth section 570, as shown in FIG. 6 (6-1), the controller 180 controls the web browser to configure a document object model tree 330 again using the received webpage source and the stored at least one object oriented program. In the following description, for clarity, the document object model tree, which is configured using the received webpage source and the at least one object oriented program to apply the corresponding function to the fourth section 570, shall be named a second document object model tree.

The controller 180 is able to control the browser to configure the second document object model tree using all of the at least one or more object oriented programs. Alternatively, the controller 180 is able to control the second document object model tree to be configured using some of the object oriented programs pre-selected by the terminal user from the at least one or more object oriented programs, for example, prior to accessing the external server. It is apparent to those skilled in the art that the terminal user is able to pre-select some of the at least one or more object oriented programs through a proper manipulation of the user input unit 130 prior to accessing the external server, of which details shall be omitted for clarity of the following description.

In the following description, assume that the second document object model tree is configured using partial (or some) object oriented programs, for example, 'Minimize.js', 'Maximize.js' and 'Moveto.js' among the at least one or more object oriented programs.

FIG. 6 (6-1) exemplarily shows that the second document object model tree is configured in a manner of adding a tree element 331 related to 'Minimize.js', 'Maximize.js' and 'Moveto.js' to the first document object model tree for the fourth section 570.

The added tree element 331 can further include an element ('image') related to a toolbar for visually representing that some of the at least one or more object oriented programs are applied to the fourth section 570 on the displayed webpage 500. The toolbar shall be described later in this disclosure.

Referring to FIG. 6 (6-2), the controller 180 controls the web browser to render and display the webpage 500, which is modified different from the former webpage originally intended by the web server 200, on the web browser window 410 using the second document object model tree [S45].

In particular, the controller 180 controls the toolbar of the selected fourth section 570, i.e., a fourth section toolbar 571 to be generated from the web browser window 410. Therefore, the terminal user is able to visually recognize that the partial object oriented programs are applied to the selected fourth section 570.

For example, icons for executing corresponding functions of some of the partial object oriented programs, i.e., a fourth section minimizing icon 573 and a fourth section maximizing icon 575 are displayed on the fourth section toolbar 571.

The terminal user is able to execute the corresponding function of the partial object oriented programs on the fourth section via the fourth section toolbar 571.

Yet, it is not mandatory for the toolbar to be generated and displayed for the fourth section 570. For instance, without generating the toolbar, the fourth section minimizing icon 573 and the fourth section maximizing icon 575 can be configured to be generated at appropriate positions within the fourth section 570.

Meanwhile, it is able to configure to interrupt an operation of applying the partial object oriented programs to the fourth section 570 in a manner that the terminal user touches the empty portion of the fourth section 570 one more time (e.g., a simple touch, a double-touch, a long-touch, etc.). Once the operation of applying the partial object oriented program is interrupted, the web browser window 410 on the touchscreen 400 can return to the state shown in FIG. 5 (5-2).

In the following description, the corresponding functions of the partial object oriented programs shall be explained in detail with reference to FIGS. 7 to 10 FIGS. 7 to 10 are diagrams of display screens for implementing a method of controlling a mobile terminal according to an embodiment of the present invention.

First of all, the corresponding functions of the object oriented programs 'Maximize.js' and 'Minimize.js' are described with reference to FIG. 7 as follows.

Figure 7:
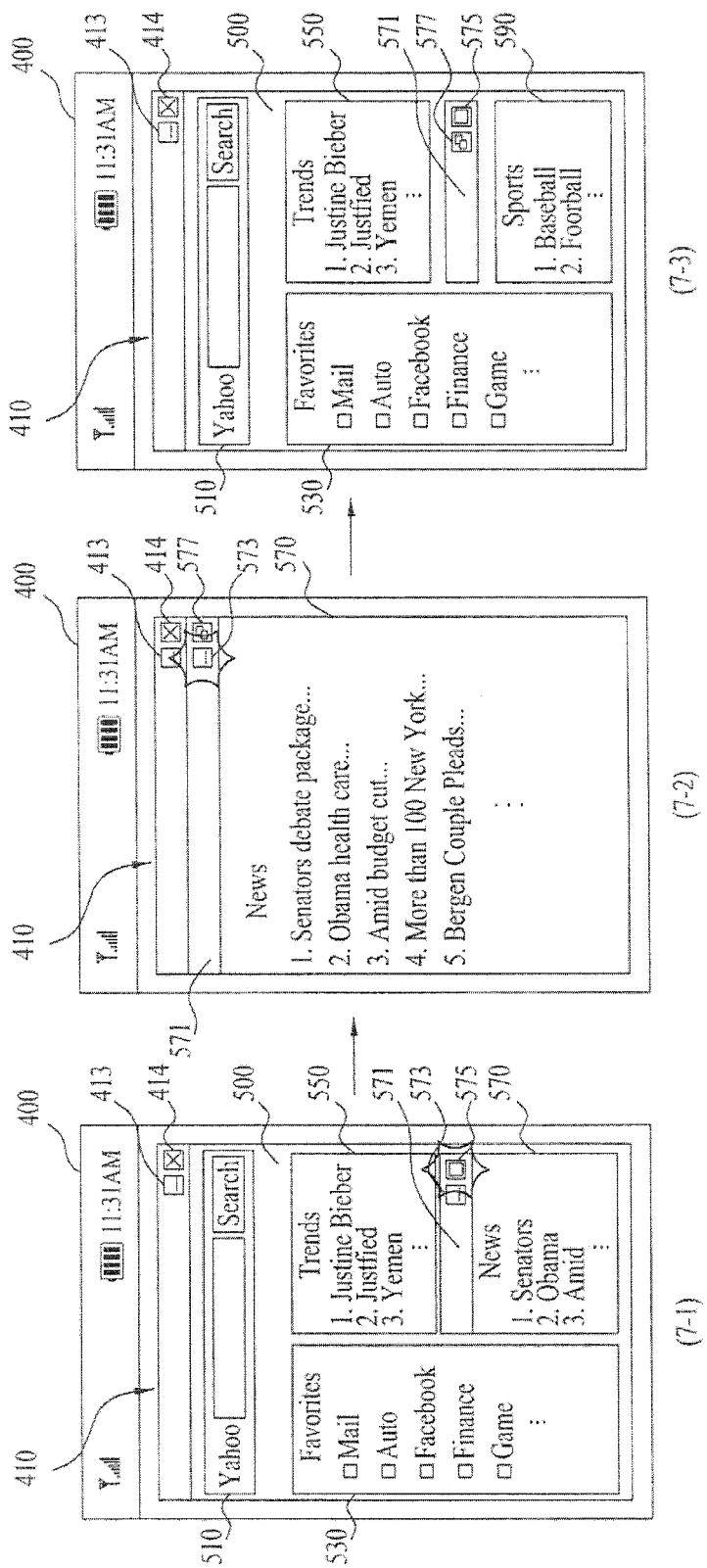
FIGS. 7 to 10 are diagrams of display screens for implementing a method of controlling a mobile terminal according to an embodiment of the present invention.

Referring to FIG. 7 (7-1), the webpage 500 having the partial object oriented program applied thereto is being displayed within the web browser window 410 on the touchscreen 400. As mentioned in the foregoing description, the toolbar 571 (i.e., the fourth section toolbar) for the fourth section is generated and displayed on the webpage 500.

The fourth section maximizing icon 575 can be selected from the fourth section toolbar 571 by being touched for example.

If so, the corresponding function of the 'Maximize.js' can be executed. In particular, referring to FIG. 7 (7-2), the fourth section 570 is maximized and displayed on the web browser window 410. When the fourth section 570 is maximized, the fourth section maximizing icon 575 disappears from the fourth section toolbar 571 and a fourth section reconstructing icon 577 can be displayed on the fourth section toolbar 571 instead.

If the fourth section reconstructing icon 577 is selected by being touched, the corresponding function execution of the 'Maximize.js' is cancelled so that the fourth section 570 can be reconstructed into the state shown in FIG. 7 (7-1).

Meanwhile, the fourth section minimizing icon 573 can be selected from the fourth section toolbar 571 shown in FIG. 7 (7-2) by being touched for example.

If so, the corresponding function of the 'Minimize.js' can be executed. In particular, referring to FIG. 7 (7-3), the fourth section 570 is minimized and displayed on the web browser window 410. When the fourth section 570 is minimized, the fourth section minimizing icon 573 disappears from the fourth section toolbar 571 and the fourth section maximizing icon 575 can be displayed again on the fourth section toolbar 571 instead.

The section (e.g., the fifth section) of the webpage 500, which was not displayed due to the problem of the limited display space shown in FIG. 7 (7-1), can exist on the web browser window 410. In this case, when the fourth section 570 is minimized in the web browser window 410, as shown in FIG. 7 (7-3), the controller 180 controls the web browser to display the fifth section 590 at the place where the fourth section 570 used to exist.

In the following description, the corresponding function of the object oriented program 'Moveto.js' is explained with reference to FIG. 8.

Figure 8:
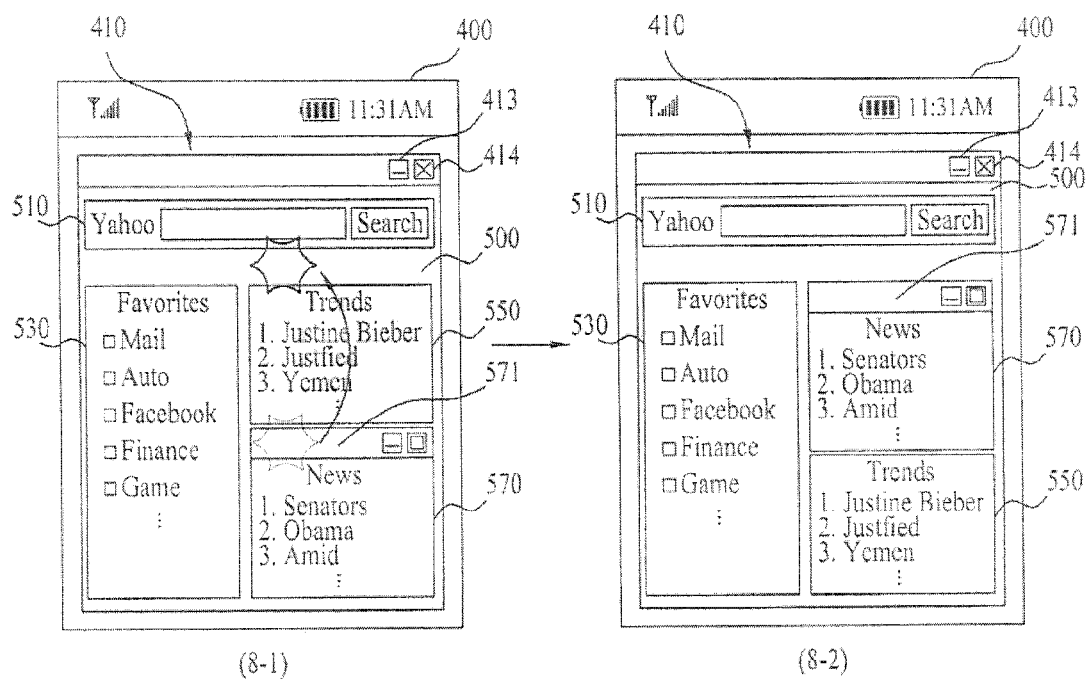

Referring to FIG. 8 (8-1), the webpage 500 having the partial object oriented programs applied thereto is being displayed within the web browser window 410 on the touchscreen 400. As mentioned in the foregoing description, the toolbar 571 (i.e., the fourth section toolbar) for the fourth section is generated and displayed on the webpage 500.

The fourth section toolbar 571 is touched & dragged to another position (e.g., right above the third section 550).

If so, referring to FIG. 8 (8-2), the controller 180 is able to control the web browser to render and display the fourth section 570 at the previous position of the third section 550. In this case, the web browser is able to render to move the third section 550 to the previous position of the fourth section 570 according to the moving of the fourth section 570. It is not mandatory for the third section 550 to move to the previous position of the fourth section 570. The web browser can be rendered to move to a random position not to be displayed by being overlapped with the fourth section 570.

In the following description, the corresponding function of the object oriented program 'Scroll.js' is explained with reference to FIG. 9. In the following description, assume that 'Scroll.js' for the fourth section 570 is included in the added tree element 331 of the second document object model tree shown in FIG. 6 (6-1).

Figure 9:
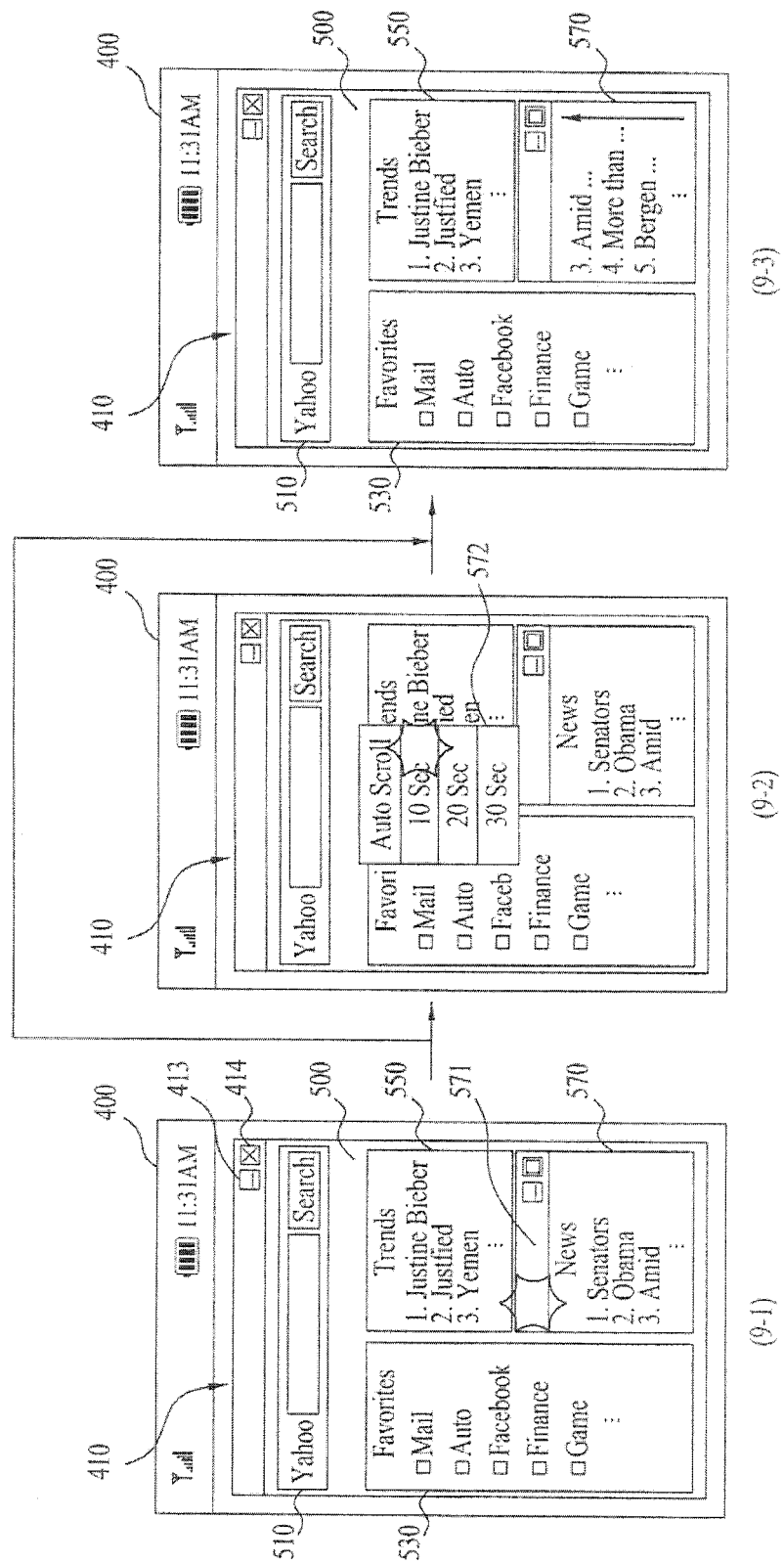

Referring to FIG. 9 (9-1), the webpage 500 having the partial object oriented program applied thereto is being displayed within the web browser window 410 on the touchscreen 400. As mentioned in the foregoing description, the fourth section toolbar 571 is generated and displayed on the webpage 500.

A long touch or a double-touch is performed on the fourth section toolbar 571.

If so, referring to FIG. 9 (9-2), an option window 572 for selecting a scroll time option can be displayed.

One time option can be selected from the option window 572 by being touched.

If so, referring to FIG. 9 (9-3), the controller 180 is able to control the web browser to scroll a content of the fourth section 571 with one round periodicity of the selected time option. In particular, if the time option is selected, a speed of the scroll can be automatically selected as long as the content of the fourth section is constant.

The content of the fourth section 571 can keep being scrolled until the fourth section toolbar 571 is long-touched or double-touched again. Alternatively, the content of the fourth section 571 can be automatically stopped after completion of one round scroll.

Alternatively, the controller 180 can control the web browser to scroll the content of the fourth section 571 during the selected time option at a preset constant speed. In particular, if the time option is selected, how many rounds it scrolls can be selected. In this case, the content of the fourth section 571 can keep being scrolled until the fourth section toolbar 571 is long-touched or double-touched again.

Meanwhile, when the fourth section toolbar 571 is long-touched or double-touched in FIG. 9 (9-1), it is not mandatory for the time option window 572 in FIG. 9 (9-2) to be displayed. In particular, without displaying the time option window 572, a preset time can be set for scrolling of the content of the fourth section.

Figure 10:
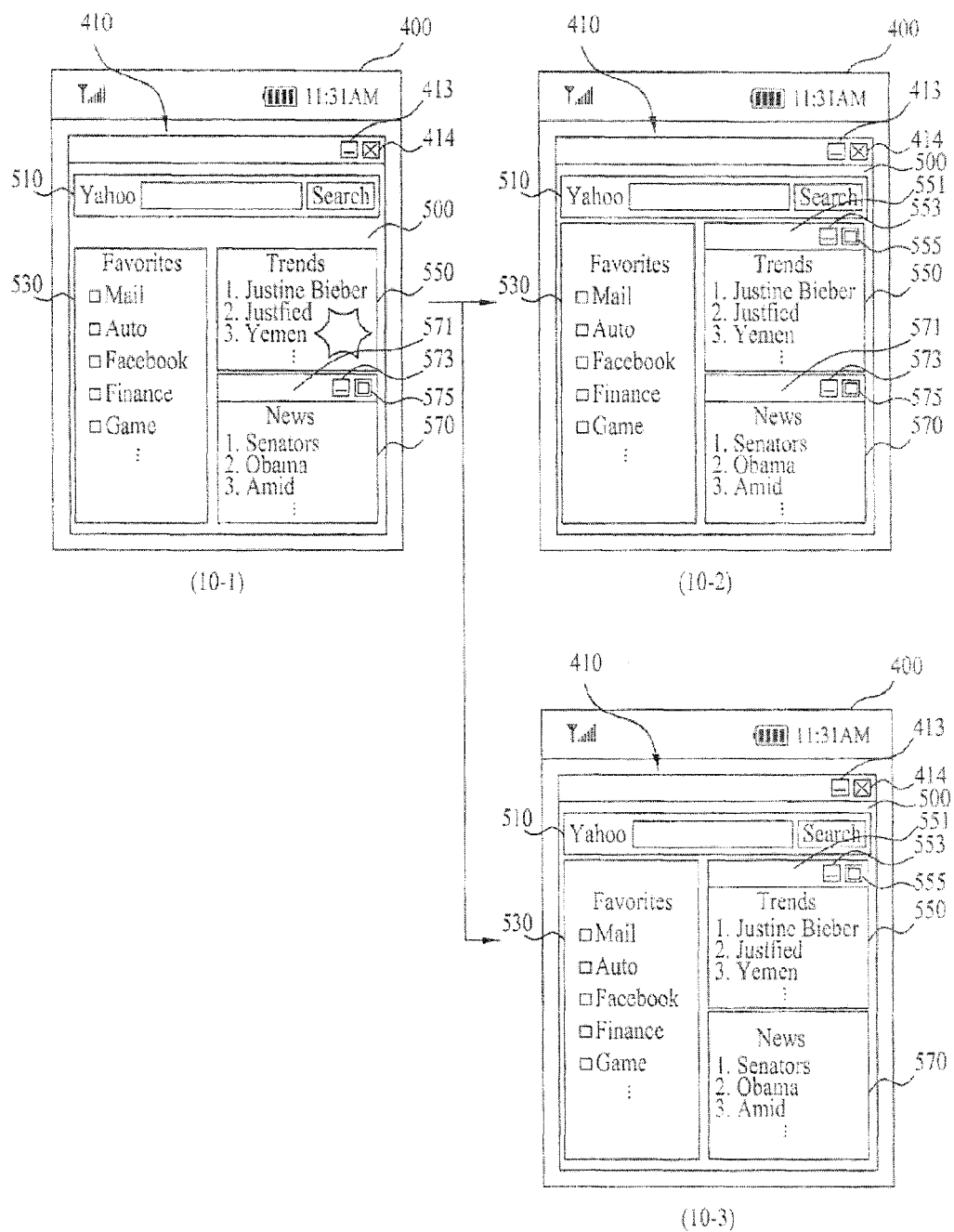

FIG. 10 shows a following case where while one section is selected from the webpage 500 and a corresponding function of the object oriented program is applied to the selected section, another section is selected. This case is explained with reference to FIG. 10 as follows.

Referring to FIG. 10 (10-1), as mentioned in the foregoing description, if the fourth section 570 has been selected from the web browser window 410, a corresponding function of the object oriented program is applied to the fourth section 570 and a fourth section toolbar 571 can be generated from the fourth section 570.

If the terminal user touches an empty portion of the third section 550 (e.g., a simple touch, a double-touch, a long-touch, etc.) for example while the fourth section toolbar 571 is displayed on the fourth section 570, the third section 550 can be touched.

If so, referring to FIG. 10 (10-2), the controller 180 is able to control a toolbar for the selected third section 550, i.e., a third section toolbar 551 to be generated from the web browser window 410. Thus, the terminal user is able to visually recognize that the object oriented program has been applied to the selected third section 550. Its details shall be omitted from the following description for clarity of this disclosure.

And, the controller 180 is able to control the fourth section toolbar 571 for the fourth section 570 to disappear. In particular, as the object oriented program is applied to the third section 550, the object oriented program may not be further applied to the fourth section 570.

Meanwhile, it is not mandatory for the fourth section toolbar 571 to disappear when the third section is selected 550. Referring to FIG. 10 (10-3), the controller 180 is able to control the fourth section toolbar 517 for the fourth section 570 to remain the same while the third section toolbar 551 is displayed on the third section 550. In particular, the object oriented program can be applied to both of the third section 550 and the fourth section 570.

In the above description, when one of the sections of the webpage displayed on the web browser window 410 is selected, the object oriented program is applied to the selected section, by which the present invention is non-limited. For instance, the object oriented program is applied not to the section selected from the sections of the webpage but to all main sections of the webpage. This is further explained with reference to FIG. 11 as follows.

Figure 11:
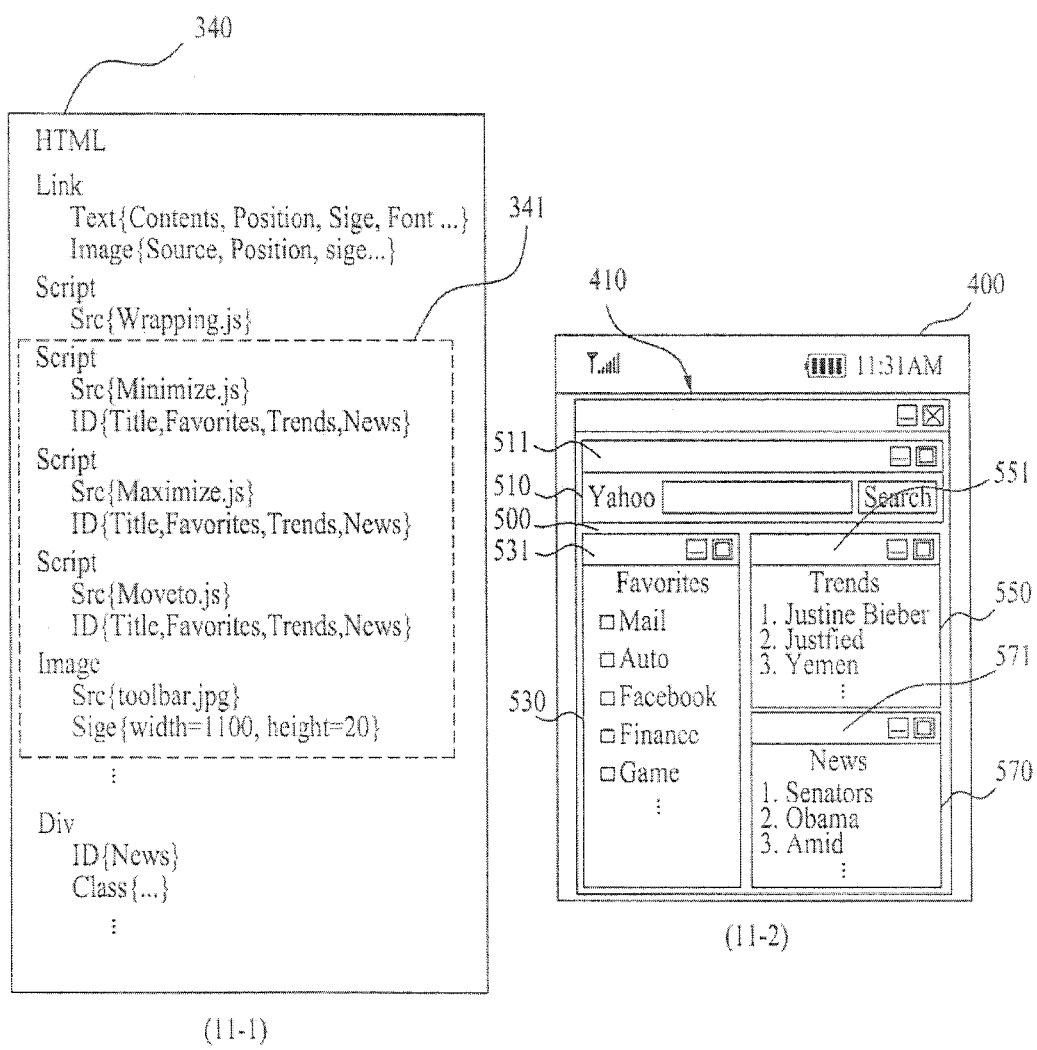
FIG. 11 is a diagram of a display screen and a corresponding document object structure for implementing a method of controlling a mobile terminal according to an embodiment of the present invention.

FIG. 11 is a diagram of a display screen and a corresponding document object structure for implementing a method of controlling a mobile terminal according to an embodiment of the present invention.

Referring to FIG. 11, as mentioned in the foregoing description, at least one object oriented program is stored in the memory 160 of the mobile terminal 100 in advance [S41].

The mobile terminal 100 accesses the external server 200 via Internet using the wireless communication unit 110 [S42].

The controller 180 of the mobile terminal 100 determines whether a URL (uniform resource locator) of the external server 200 is a preset URL.

As a result of the determination, if the URL (uniform resource locator) of the external server 200 is not the preset URL, referring to FIG. 5 (5-1) and FIG. 5 (5-2), the controller 180 controls the web browser to configure a document object model tree 320 by receiving the webpage source from the external server 200. And, the controller controls the web browser to render and display a webpage using the configured document object model tree 320.

As a result of the determination, if the URL (uniform resource locator) of the external server 200 is the preset URL, in order a corresponding function of the object oriented program to be applied to all main sections of the webpage 500, referring to FIG. 11 (11-1), the controller 180 controls the web browser to configure a document object model tree 340 using the received webpage source and the stored at least one object oriented program. In the following description, for clarity, the document object model tree 340 configured using the received webpage source and the stored at least one object oriented program in order to apply the corresponding function to all of the main sections shall be named a third document object model tree.

FIG. 11 (11-1) exemplarily shows that the third document object model tree is configured in a manner of adding a tree element 341 related to 'Minimize.js', 'Maximize.js' and 'Moveto.js' to the first document object model tree for all of the sections.

Referring to FIG. 11 (11-2), the controller 180 controls the web browser to render and display the webpage 500, which is modified different from the former webpage originally intended by the web server 200, on the web browser window 410 using the third document object model tree 340. In FIG. 11 (11-2), exemplarily shown is that toolbars 511, 531, 551 and 571 are generated for all the main sections from the web browser window 410, respectively.

In the above description, if the URL (uniform resource locator) of the webpage of the web server 200 is the preset URL, the object oriented program is applied to all the main sections of the webpage, by which the present embodiment is non-limited. Alternatively, without determining whether the URL (uniform resource locator) of the webpage of the web server 200 is the preset URL, it is able to configure the object oriented program to be unconditionally applied to all the main sections of the webpage.

In the above description, the object oriented program is applied to all the main sections of the webpage, by which the present embodiment is non-limited. Alternatively, it is able to configure the object oriented program to be applied to all sections (i.e., all main sections and their subsections) of the webpage.

In the above description, the dependent object oriented program is applied in association with sections existing on the webpage, by which the present embodiment is non-limited. Alternatively, in case of the independent object oriented program (e.g., MP3.js, Mobile_TV.js, Dual_Clock.js, Call.js), it can be configured to apply to the webpage irrespective of the sections existing on the webpage.

This is further explained with reference to FIGS. 12 to 14 as follows.

Figure 12:
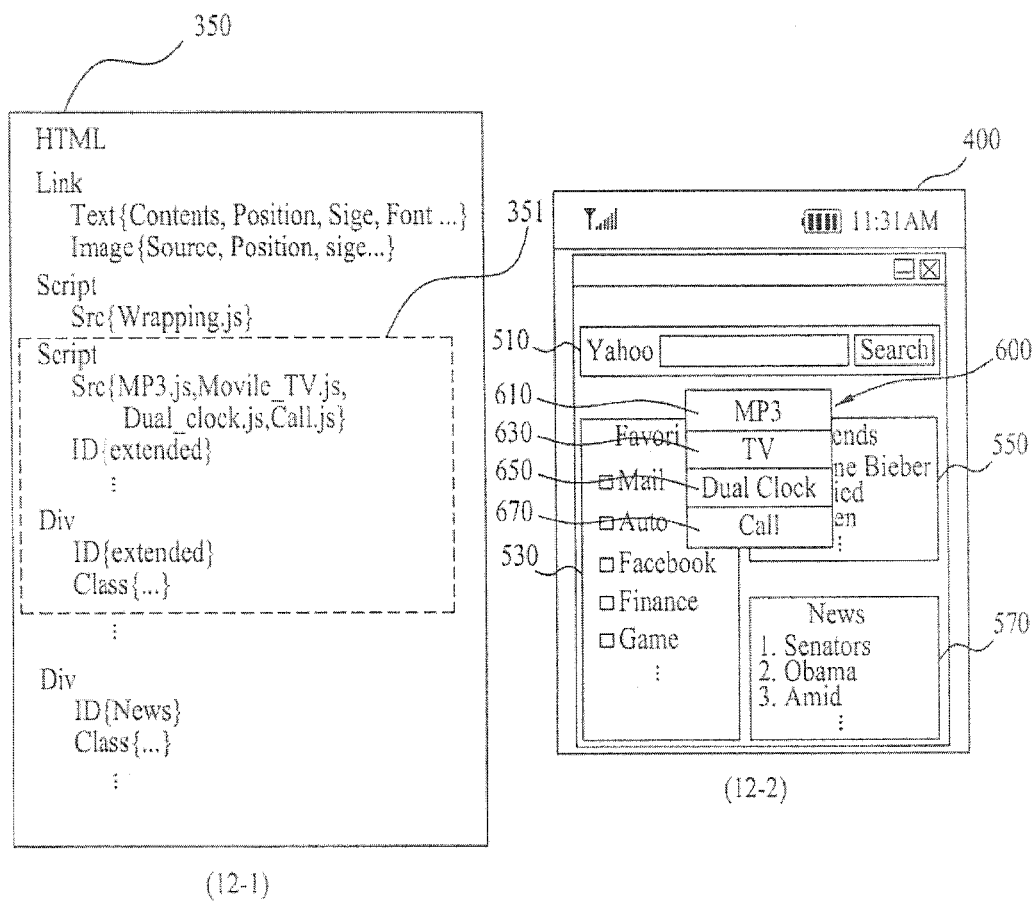
FIG. 12 is a diagram of a display screen and a corresponding document object structure for implementing a method of controlling a mobile terminal according to an embodiment of the present invention.

FIG. 12 is a diagram of a display screen and a corresponding document object structure for implementing a method of controlling a mobile terminal according to an embodiment of the present invention. And, FIG. 13 and FIG. 14 are diagrams of display screens for implementing a method of controlling a mobile terminal according to an embodiment of the present invention.

As mentioned in the foregoing description with reference to FIG. 5 (5-2), the web browser is able to render and display the webpage 500, which was originally intended by the web server 200, on the web browser window 410 using the first document object model tree 520.

In this case, a terminal user is able to input a command for applying the independent object oriented program to the webpage irrespective of sections existing on the webpage. The command can be inputted in various ways. The command can be inputted via an appropriate manipulation of the user input unit 130. Alternatively, the command can be inputted in a manner that an empty portion of the displayed webpage 500 is touched (e.g., a simple touch, a double-touch, a long-touch, etc.).

If so, in order to apply the corresponding function of the independent object oriented program to the webpage, referring to FIG. 12 (12-1), the controller 180 controls the web browser to configure the document object model tree 350 again using the received webpage source and the independent object oriented program. For clarity, the document object model tree, which is reconfigured to apply the corresponding function to the fourth section 570 using the received webpage and the independent object oriented program, shall be named a fourth document object model tree 350 in the following description.

In case that one independent object oriented program exists to be applied only, it can be directly executed on the webpage.

Yet, in case that at least two independent object oriented programs exist to be applied, referring to FIG. 12 (12-2), the controller 180 is able to control the web browser to generate and display a new section 600 for selecting a program to apply to the webpage 500 among the at least two independent object oriented programs.

For example, 'MP3' execute option 610, 'TV' execute option 630, 'dual clock' execute option 650 and 'Call' execute option 670 respectively corresponding to the independent object oriented programs are displayed on the newly generated section 600.

In this case, a terminal user is able to select one option (e.g., the MP3 execute option 610) from the above displayed options. The selection can be made through an appropriate manipulation of the user input unit 130. Alternatively, the selection can be made through a touch action performed on a corresponding section displayed on the touchscreen 400.

If the MP3 execute option 610 is selected, referring to FIG. 13 (13-1), an MP3 execute section 611 for the MP3 function execution can be displayed on the webpage 500. Therefore, the terminal user is able to execute the MP3 function via the MP3 execute section 611. If the MP3 function is executed, an audio file (e.g., MP3 file, way file, etc.) previously stored in the memory 160 can be executed. It is apparent to those skilled in the art that the MP3 function is executed via the MP3 execute section 611 (e.g., MP3 file execution), of which details shall be omitted from the following description for clarity.

The MP3 execute section 611 can be touched & dragged to a prescribed position.

If so, referring to FIG. 13 (13-2), the MP3 execute section 611 is moved to the prescribed position on the webpage 500 and is then displayed thereon.

The minimizing icon 413 in the web browser window 410 can be touched.

If so, referring to FIG. 13 (13-1), as the web browser window 410 is minimized, the MP3 execute section 611 is not further displayed on the touchscreen 400. Thus, the MP3 execute section 611 can be distinguished from a general widget, which continues to be displayed on a display screen.

Even if the web browser window 410 is minimized in the course of the execution of the MP3 file, the execution of the MP3 file can proceed continuously irrespective of the minimized web browser window 410.

As the window closing icon 414 is touched in the course of the execution of the MP3 file, if the web browser window 410 is closed, the execution of the MP3 file is interrupted or can keep proceeding irrespective of the closing in a manner that a separate graphic interface for the MP3 playback is displayed on the touchscreen 400.

In the above description, the independent object oriented program 'MP3.js' is explained with reference to the MP3 execution option and its execution section. And, it is apparent to those skilled in the art that this description is applicable to other independent object oriented programs as well.

In the above description, as one execute option is selected by the mobile terminal, the corresponding object oriented program is executed on the webpage, by which the present embodiment is non-limited. Alternatively, for example, the object oriented program can be executed on the webpage without a selection made by a terminal user. This is further explained with reference to FIG. 14 as follows.

Referring to FIG. 14 (14-1), the web browser is able to render and display the webpage 500, which was originally intended by the web server 200, on the web browser window 410 using the first document object model tree 520.

In this case, the mobile terminal 100 is able to receive a phone call signal from a counterpart terminal.

If so, in order to apply the corresponding function of the object oriented program 'Call.js' to the webpage, the controller 180 controls the web browser to configure the document object model tree again using the received webpage source and the object oriented program 'Call.js' [not shown in the drawing].

Referring to FIG. 14 (14-2), the controller 180 is able to control the web browser to generate and display a phone call indicating section 671 for indicating the phone call reception on the webpage 500. In this case, the phone call indicating section 671 can include a call icon 672 and a rejection icon 673.

If a call is initiated in a manner that the terminal user touches the call icon 672 in the phone call indicating section 671, referring to FIG. 14 (14-3), a phone call section 674 can be displayed for the initiated call.

If the minimizing icon 413 in the web browser window 410 is touched, referring to FIG. 14 (14-4), as mentioned in the foregoing description, the web browser window 410 is minimized so that the phone call section 674 is not further displayed on the touchscreen 400.

Accordingly, the present invention provides the following effects and/or advantages.

First of all, according to at least one of embodiments of the present invention, although there are a lot of contents to display on a webpage, the webpage can be conveniently viewed.

Secondly, according to at least one of embodiments of the present invention, while a webpage is being displayed in a mobile terminal, a function frequently used by the mobile terminal is available by interconnecting to the webpage despite that the webpage is not closed.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display;
a wireless communication unit to communicate with an external server;
a memory to store a first object oriented program that has a call function; and
a controller configured to receive a webpage source of a webpage including a plurality of sections from the external server and to control a web browser for the received webpage source,
wherein the controller is further configured to:
control the web browser to configure a first document object model tree by using the received webpage source of the webpage, and display the plurality of sections according to the first document object model tree within the web browser on the display,
in response to receiving a call from another terminal, control the web browser to configure a second document object model tree to have the call function, by using the received webpage source of the webpage and the stored first object oriented program, and control the web browser to generate a new section for the call function to be displayed together with the same plurality of sections within the web browser on the display according to the second document object model tree, wherein minimizing the web browser on the display causes both the plurality of sections and the new section for the call function to not be displayed on the display.

2. The mobile terminal of claim 1, wherein the display includes a touchscreen, and the controller controls a specific one of the plurality of sections to be selected when the specific section is touched.

3. The mobile terminal of claim 1, wherein the call function is independent from the plurality of sections.

4. The mobile terminal of claim 1, wherein when the web browser is minimized, the controller controls the call function to continue to be executed.

5. The mobile terminal of claim 1, wherein the memory further stores a second object oriented program associated with a toolbar, wherein in response to selecting a specific one of the plurality of sections, the controller controls the web browser to configure a third document model tree by using the webpage source and the stored second object oriented program such that the toolbar is generated only for the selected section within the web browser on the display, and wherein when a prescribed command is inputted via the toolbar, the controller minimizes, maximize or moves the selected specific section corresponding to the toolbar within the web browser on the display.

6. The mobile terminal of claim 5, wherein when a uniform resource locator (URL) of the webpage provided by the external server corresponds to a previously registered URL, the controller controls the toolbar to be generated.

7. The mobile terminal of claim 1, wherein the webpage source is configured using hypertext markup language (HTML).

8. A method of controlling a mobile terminal, comprising:
storing a first object oriented program that has a call function;
communicating with an external server that provides a webpage including a plurality of sections;
receiving information of a webpage source of the webpage from the external server;
controlling a web browser to configure a first document object model tree by using the webpage source, and display the plurality of sections according to the first document object model tree within the web browser on a display;
in response to receiving a call from a third party, controlling the web browser to configure a second document object model tree to have the call function, by using the received webpage source of the webpage and the stored first object oriented program; and
controlling the web browser to generate a new section for the call function to be displayed together with the same plurality of sections within the web browser on the display according to the second document object model tree,
wherein minimizing the web browser on the display causes both the plurality of sections and the new section for the call function to no longer be displayed on the display.

9. The method of claim 8, wherein the call function is independent from the plurality of sections.

10. The method of claim 8, further comprising controlling the call function to continue to be executed when the web browser is minimized.

11. The method of claim 8, further comprising:
further storing a second object oriented program associated with a toolbar;
in response to selectins a specific one of the plurality of sections, controlling the web browser to configure a third document model tree by using the webpage source and the stored second object oriented program such that the toolbar is generated only for the selected section within the web browser on the display;
receiving a prescribed command via the toolbar; and
minimizing, maximizing or moving the specific section corresponding to the toolbar.

12. The method of claim 11, wherein when a universal resource locator (URL) of the webpage provided by the external server corresponds to a previously registered URL, the toolbar is generated.

13. The method of claim 8, wherein configuring the webpage source includes configuring the webpage source using hypertext markup language (HTML).

* * * * *